March 11, 1969  W. H. SCOTT  3,431,647
HEDGE TRIMMER

Filed April 18, 1966  Sheet 1 of 3

INVENTOR
William H. Scott
BY Hofgren, Wegner, Allen, Stellman & McCord
ATTORNEYS

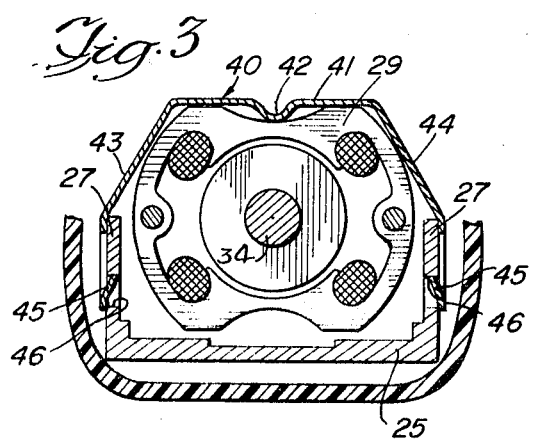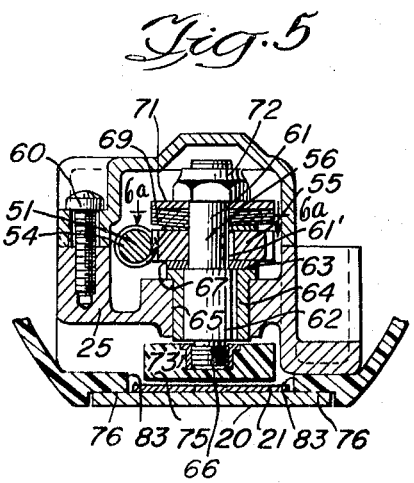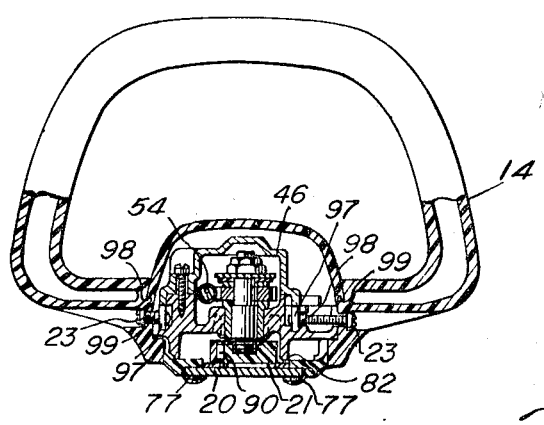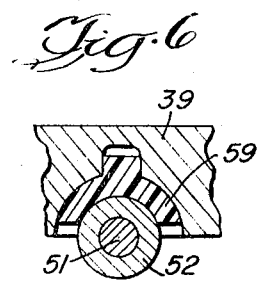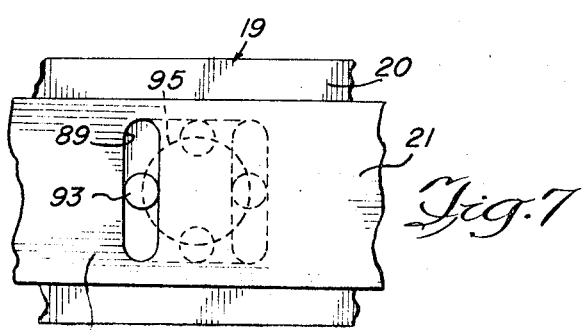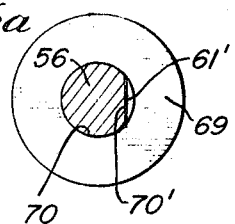

United States Patent Office 3,431,647
Patented Mar. 11, 1969

3,431,647
HEDGE TRIMMER
William H. Scott, Glen Ellyn, Ill., assignor to Portable Electric Tool, Inc., a corporation of Illinois
Filed Apr. 18, 1966, Ser. No. 543,372
U.S. Cl. 30—210       9 Claims
Int. Cl. B26b 15/00

ABSTRACT OF THE DISCLOSURE

A hedge trimmer is provided with a double insulated housing such that the blade is insulated from the motor and from the user. The motor is also double insulated from the user. The hedge trimmer has the motor and transmission assembled in a unitized fashion such that the unit can be removed from the housing for repairs and inspections. The transmission includes a clutch means that prevents overloads and shock loads from being transmitted from the blade to the motor. The power train from the motor to the clutch means includes a shaft with a novel end bearing mounting for absorbing axial thrust loads.

---

This invention relates to a hedge trimmer and more particularly to an improved electrically driven or power operated hand held hedge trimmer.

In current use today are a large number of hedge trimmers which are driven by hand, by motors or by battery operated electrical devices. Of these trimmers, many were originally designed to be powered by hand and have since been adapted for power operation by adding an electric or gas driven motor thereto. These devices are obviously very complex, very heavy and not very efficient in use. Other hedge trimmers, even those designed for electric or power operation, have the disadvantage of having a direct electrical connection between the blade and the housing carrying the motor. With these constructions, in the event the blade happens to strike the electric cord connected to the motor or some other electrical device, a very dangerous electrical short can pass back through the blade to the motor and in some instances, to the operator. If the operator happens to be unfortunate enough to be standing in damp grass or in some other way is grounded, the effect could even be fatal.

In addition, in the event the electric motor shorts out or in the event any of the wiring within the housing shorts against the housing, the electrical connection can pass back through the housing either to the operator, giving him a shock, or to the blade so that the blade becomes electrically charged and dangerous.

The devices in use today have the electric motors mounted directly to the housing which supports both the blade and the holding means of the trimmer. This means that the mechanical shock loads from the blades are passed back through the motor to the housing and to the operator. In addition, any repairs that are required on the motor or on the transmission between the motor and the blade necessitates that the whole handle and housing construction be taken apart in order to effect the repair directly within the housing.

A further disadvantage of the current trimmers is entailed in the means for transmitting the motion from the motor to the blades. This is done through a direct drive with relatively little thrust take-up between the motor and the blades. This causes failures in the drive system or burning out of the motor with the attendant disadvantages thereto.

It is therefore a principal object of my invention to provide an improved hedge trimmer which overcomes all of the above stated disadvantages of the prior art.

It is a principal object of my invention to provide an improved hedge trimmer wherein the housing is made of mechanically and electrically shock-resistant plastic which prevents transmission of electrical shock therethrough, and substantially reduces cracks in the housing due to mechanical shock transmission.

It is another object of my invention to provide a modular motor and transmission mounting frame means which can be readily inserted or removed from the housing for repair or replacement.

It is another object of my invention to provide an improved means for insulating the motor and transmission frame module from the blades of the cutting means of the trimmer.

And a still further object of this invention is to provide a motion transmitting means between the transmission means and the movable blade that not only converts rotary motion to oscillatory motion but also electrically insulates the blade from the transmission means and from the motor.

And still another object of this invention is to provide in the modular frame means for the motor and transmission means, a means for absorbing the thrust and mechanical shock loads created between the trimmer blades and the motor.

And a still further object of this invention is to provide an improved hedge trimmer having friction clutch means in the power transmission means of the system which is adapted to mechanically disconnect the motor from the movable cutting blade when the blade enrounters an overload condition.

And another object of this invention is to provide an improved mounting for a motor for a hedge trimmer wherein the motor is secured to its mounting frame by a spring clip means.

And a still further object of this invention is to provide an improved hedge trimmer housing having hand hold members positioned with respect to the housing so as to effect the most efficient maneuverabiltiy of the hedge trimmer.

These and other objects will be apparent from the following description taken in connection with the drawings wherein:

FIGURE 3 is a partial cross sectional view taken along lines 3—3 of FIGURE 1;

FIGURE 4 is a partial cross sectional view taken along the lines 4—4 of FIGURE 1 with portions of the hand hold shown in full view;

FIGURE 5 is an enlarged view of part of the cross sectional view taken along the lines 5—5 of FIGURE 1;

FIGURE 6 is a cross sectional view taken along the lines 6—6 of FIGURE 1;

FIGURE 6a is a cross sectional view taken along the lines 6a—6a of FIGURE 4;

FIGURE 7 is a partial schematic view showing the relative positions of the drive pin between the motion transmitting means, the cutting blade and the fixed blade;

Figure 1:
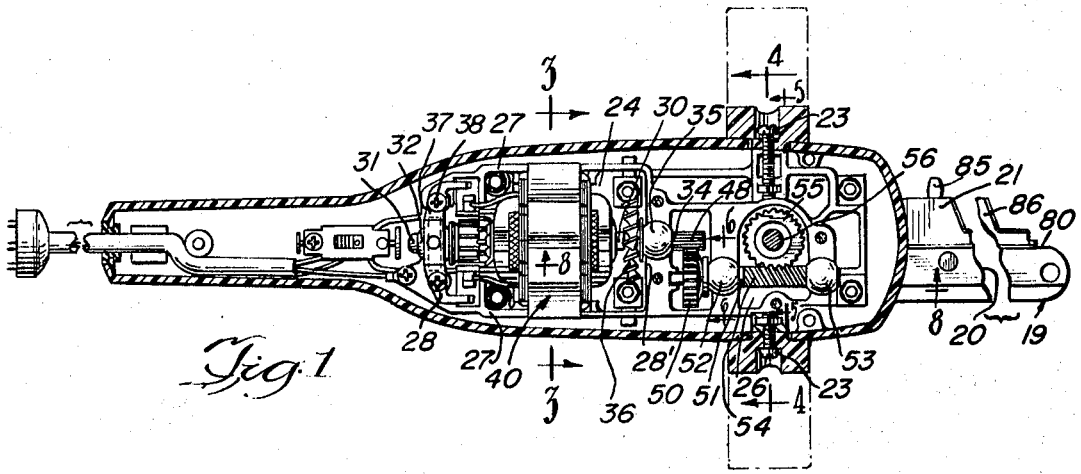
FIGURE 1 is a top plan view of a hedge trimmer incorporating my invention with the top half of the housing removed and with parts shown in section.

Although the subject matter of this invention is susceptible of illustration in many different variations, I have chosen to illustrate a preferred form throughout the views. In particular, referring to FIGURES 1 and 2, a hedge trimmer 10 according to my invention is shown and includes a housing member 11 having a handle 12 and a hand hold 14. The housing 11 is divided into a bottom half 15 and a top half 16 joined together along a parting line 17 by means of screws 17' passing from one half into the other. An electric cord 18 which is adapted to be plugged into a source of electric power enters the hedge trimmer housing 11 through the handle 12. The hedge trimmer has a cutting portion 19 which extends from the lower portion of the bottom half 15 of the housing 11 and is comprised of a fixed cutting blade 20 and a movable cutting blade 21. The handle 12 is adapted to be gripped by the one hand of a user and has an actuating button 22 conveniently mounted on the upper surface thereof. Air vents 22' are formed in the bottom wall of the bottom half 15 of the housing 11 to permit air to flow into the interior of the housing.

By removing the screws 17' the cover 16 is removed from the housing 11 to expose the operating parts of the hedge trimmer. The cover 16 can be removed without removing the hand hold 14. In this way the operating parts can be inspected, oiled and minor repairs made thereto without complete disassembly of the housing. The hand hold 14 is attached to the bottom half 15 of the housing 11 by means of screws 23 which screws are anchored to the housing in a novel manner to be described hereinafter.

Within the housing 11 is fastened a metal frame member 25 which extends across a major portion of the bottom half 15 of the housing and throughout a major portion of the length thereof. The frame 25 is divided into two portions, a motor portion 24 and a transmission portion 26. The motor portion 24 has upstanding side walls 27, an end wall 28 and a partition wall 28' and is adapted to receive within said walls the major portion of an electric motor 29. Motor 29 is shown as the type that has a pass-through shaft 30 with a rear portion 31 extending from one end of the motor and adapted to be nested in a bearing and socket arrangement 32 on the end wall 28 of the frame 25. The front portion 33 of the shaft 30 is mounted in a sleeve and socket bearing 35 is carried by the partition wall 28' of the frame member 25. A fan 36 is attached to the front portion 33 of the shaft 30 so as to force air through the vents 22' in the housing and past the motor 29 for cooling same. A bearing retaining plate 37 is secured by screws 38 to the end wall 28 to hold the bearing and rear portion 31 of the shaft 30 of the motor to the frame 25. The front portion 33 of the shaft 30 and the bearing 35 are secured to the partition wall by a flange 39' on a frame cover 39 which will be more fully discussed hereinafter.

Figure 2:
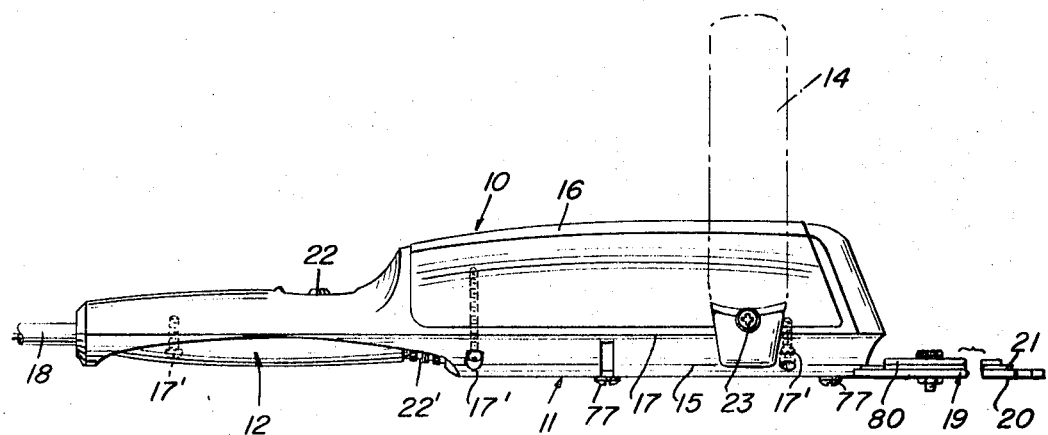
FIGURE 2 is a side elevational view of the hedge trimmer showing the one hand hold member in phantom.
Figure 8:
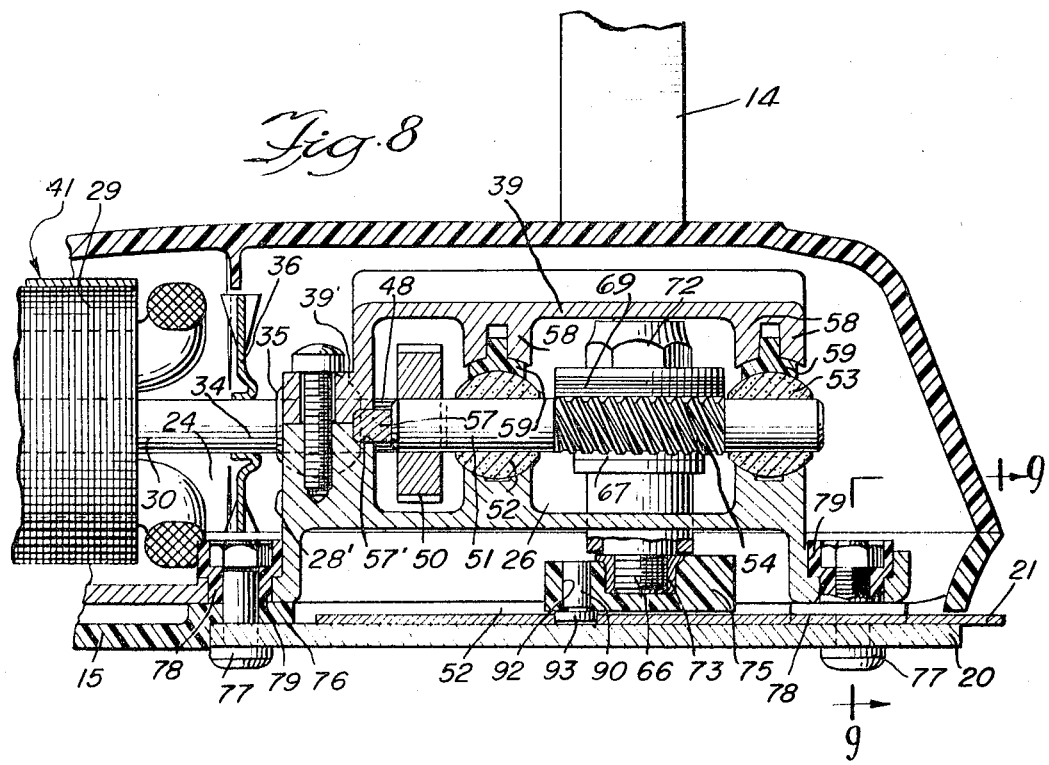
FIGURE 8 is an enlarged cross sectional view taken along the lines 8—8 of FIGURE 1.
Figure 9:
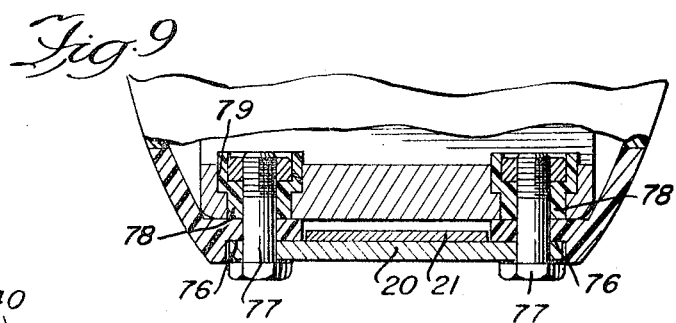
FIGURE 9 is a partial cross sectional view taken along the lines 9—9 of FIGURE 8.
Figure 10:
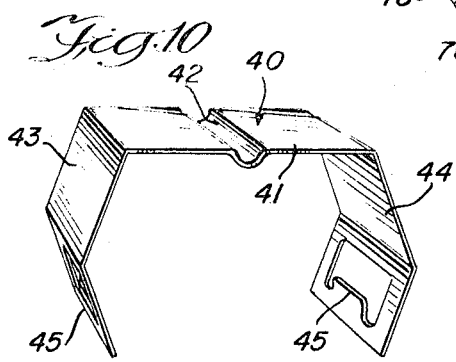
FIGURE 10 is a perspective view of the spring clip for use in securing the motor to the motor mounting frame.

The motor 29 is resiliently fastened to the frame member 25 by means of a spring retaining member 40. The spring retaining member 40 is shown in the perspective view FIGURE 10 and has a top planar portion 41 with an indented center section 42. Each one of the pair of leg members 43 and 44 depend first generally outward and downward from the planar portion and then inward and downward with inwardly struck tang members 45 formed in said inward and downward portions thereof. The indented center section 42 of the top wall 41 is adapted to bear against an indented center section of the motor 29 so that with the tang members 45 engaging in slots 46 in the walls 27 of the frame 25, the motor will be resiliently locked to the frame member 25. As can be seen in FIGURES 1 and 3, the motor 29 does not rest on the frame 25, but rather is suspended between the oppositely extending ends 31 and 33 of the shaft 30 with the spring retainer 40 holding the motor against rotation about the axis of the shaft 30.

The front portion 34 of the shaft 30 has a gear 48 formed therein with teeth running axially of the shaft so as to resemble a spline on said portion 34 of the shaft. The gear 48 meshes with a pinion gear 50 carried by and keyed onto stub shaft 51 which has its axis horizontally disposed in the transmission portion 26 of the frame member 25 by means of a pair of spaced apart bearings 52 and 53. The stub shaft 51 has a worm gear 54 on the end remote from the pinion gear 50. The worm gear 54 meshes with a pinion gear 55 loosely carried on a second stub shaft 56 which has its axis vertically disposed at right angles to the horizontal axis of the stub shaft 51. The pinion gear end of the horizontal stub shaft 51 is stepped down into a smaller diameter end 57, which end 57 is adapted to nest in a bearing recess 57' formed in the partition wall 28' of the frame member 25. With the motor 29 running, the gear 48 drives the pinion 50 and stub shaft 51 so that the worm 54 drives the gear 55. The forces created by the worm gear 54 driving the gear 55 causes the stub shaft 51 to be urged toward the end 57 so that with end 57 nested in the recess 57' of the wall 28', the wall 28' absorbs the end thrust from the stub shaft 51.

The frame cover 39 which is adapted to fit over the transmission portion 26 of the frame member 25 has downwardly depending fingers 58 which are adapted to hold semispherical grommets 59 in engagement with the bearings 52, 53. The cover 39 is held in position on the frame 25 by means of several screws 60, two of which pass through the flange 39' into the partition wall 28', one of which passes into one side wall of the frame 25 as shown in FIGURES 4 and 5 and others of which pass through the cover into the walls of the frame 25 in appropriate places. The cover 39, therefore, retains the bearing 35 on shaft 30 and the bearings 52, 53 on the stub shaft 51 properly aligned for transmitting power.

The vertical stub shaft 56 has an upper portion 61 which has a flat 61' cut in one side thereof. Since the pinion gear 55 loosely encircles the portion 61 of the shaft 56 and has no mating flat, the gear 55 will be allowed to rotate about the axis of the shaft 56. The shaft 56 has an enlarged lower portion 62 which provides a horizontally disposed shoulder 63. The enlarged portion 62 rotatably passes through a sleeve bearing 64 seated in an opening 65 in the lower portion of the frame 25. The portion 62 of the shaft 56 has a reduced diameter threaded end 66 extending downwardly therefrom and projecting below the frame 25. A bearing washer 67 encircles the shaft 56 and is positioned to bear on one side against the gear 55 and to bear on the other side against the shoulder 63 and the end wall of the bearing 64. A clutch means is provided which is comprised of a plurality of cup-shaped Belleville springs 69 which have apertures 70 therethrough. A flat 70' is formed across one side of each aperture 70, which flats 70' are adapted to coincide with the flat 61' in the side of the portion 61 of the shaft 56 when said springs 69 are assembled around the shaft 56 so that the springs 69 will rotate with the shaft 56. A planar thrust washer 71 is urged against the endmost spring 69 by means of a nut 72 threaded on the shaft 56. The nut 72 can be used to draw the shoulder 63 on the shaft 56 closer thereto to compress the Belleville springs 69 between the washer 71 and the gear 55. The amount of frictional engagement between the surfaces of the pinion gear 55 and the spring 69 can be controlled by the amount of clamping created by tightening the nut 72 down on the shaft 56. Since the gear 55 can rotate relative to the shaft 56, the only way the rotational motion of the gear 55 can be transmitted to the shaft 56 is through the spring clutch means created by the Belleville springs 69. That is, the frictional forces created by the springs 69 which are keyed to the shaft 56 bearing on the pinion gear 55 will cause the rotation of the gear 55 to be transmitted to the shaft 56. When a resistance to the rotation of the shaft 56 exceeds the frictional forces between the springs 69 and the gear 55, the gear 55 will rotate relative to the spring 69 and relative to the shaft 56.

As can best be seen in FIGURES 4 and 5 with the spring loading of the gear 55 and the shaft 56 just described, the worm gear 54 will drive the pinion 55 which in turn will transmit the motion to the shaft 56 as long as the friction between the Belleville springs and the face of the pinion 55 is greater than the force required to be moved by the end of the shaft 56. The end 66 of the shaft 56 is threaded into a sleeve 73 which is rigidly embedded in a motion transmitting block 75 made of a material that is not only anti-friction in character but also electrically non-conducting. The block 75 is commonly referred to as a motion transmitting means which receives the rotary motion from the shaft 56. The block 75 can be made of Nylon or Delrin type material which have ideal insulating characteristics as well as anti-friction characteristics.

The elongate fixed cutting blade 20 is nested in a pair of recesses 76 formed in the bottom wall of the housing 11 so that with the blade in position in the recesses, the outer contour of the housing has a relatively unbroken configuration. The fixed blade 20 is bolted to the housing and the frame 25 by means of bolts 77 which pass through the blade 20, the bottom portion of the housing and into insulating washers or sleeves 78 seated in apertures 79 formed in the bottom wall of the frame member 25. With the blade 20 insulated from the frame 25 by means of the washers 78 and with the housing 11 formed of nonconducting material, it can readily be seen that any electrical current attempting to flow through the blade 20 will not be transmitted to the frame 25. Resting on top of the fixed blade 20 is the movable blade 21 which is mounted for horizontal reciprocation along the length of the fixed blade 20 in tracks 80 formed on the fixed blade and in guides 82 formed by the facing vertical edges 83 of the bottom wall of said housing 11. Both the fixed blade 20 and the movable blade 21 have laterally projecting teeth 85, 86, respectively, which are adapted to overlap during use to effect the scissors or cutting motion of the blade. The rear end portion 87 of the movable blade 21 projects into the housing between the fixed blade and the bottom of the frame 25 and as shown in FIGURE 7 has a slot 89 formed at right angles to the longitudinal axis of said blade. A pin 90 is fastened in an aperture 92 in the motion transmitting block 75 and has a bearing portion 93 projecting downwardly from said block into the slot 89 formed in the movable blade 21. As the motion transmitting block 75 rotates about the axis of the shaft 56, the drive pin 90 will rotate in a circle 95, shown in dotted lines in FIGURE 7. With the rotary motion of the pin 90 being transmitted to the movable blade 21, which blade is trapped for axial or linear motion only, all of the rotary forces are translated to linear motion as the portion 93 on the pin 90 slides back and forth in the slot 89 in the blade 21. The rotary or circular motion of the block 75, shaft 56, and pin 90 is transmitted into axial or linear straight line motion of the movable blade 21 relative to the fixed blade 20 to effect the cutting action between blades 20, 21. Since the drive pin 90 in the block 75 is insulated from the shaft 56 by means of the nylon or other insulating material forming the motion transmitting block 75, there is no direct metal to metal connection between the movable blade 21 and the shaft 56 of the motion transmitting mechanism and therefore no electrical current can travel from the blade 21 to the frame 25 or vice versa.

The housing 10 is adapted to be made of special shock resistant nonconducting type plastic material. It is preferable that this material is made in such a way that heat, mechanical shock or electrical current will not affect its appearance or durability.

From the above described subject matter, it can readily be seen that the motor 29 and motion transmitting mechanism are individually mounted in the frame means 25, which frame means is attached to the lower half 15 of the housing 11. The frame means 25 can be readily removed from the housing 10 for repair or replacement. That is, with the cover 16 removed from the lower portion 15, loosening of the screws 77 permits the modularized motor 29, transmission means and the frame 25 to be removed from the housing. When the frame 25 with the motor 29 and transmission means is lifted out of the housing, the drive pin 90 lifts out of the slot 89 in the movable blade 21.

The hand hold 14 is connected to the bottom portion 15 of the housing 11 by means of a novel screw 23 and nut 97 arrangement. Specifically, nuts 97 are trapped in the side walls of the frame 25 in alignment with apertures 98 in the walls of the bottom portion 15 of the housing. The hand hold 14 can be secured to the bottom portion 15 by inserting the screws 23 through the appropriate openings 99 in the hand hold 14 and into the nuts 97 seated in the frame 25 in the housing. After the hand hold 14 is attached to the bottom portion 15, the top portion 16 of the housing 11 can be attached to said bottom half 15 by means of screws 17' whereby the hedge trimmer housing 11 is assembled.

The frame 25 with the motor 29 and transmission means attached thereto form a module or modularized unit which can be removed from the housing 10 so that the motor or transmission can be repaired. The motor can be removed from the frame 25 by spreading the two legs 43, 44 of the spring clip 40 until the tangs 45 snap out of the openings 46 in the walls 27 of the frame so that the clip 40 can be removed therefrom. The retainer 32 and cover 39 can be removed so that the motor and transmission can be repaired or replaced. The motor and transmission can be repaired with the frame 25 in the housing or removed from the housing by simply removing the retainer 32 and cover 39 and proceeding with the repair or replacement.

In use in the event the movable blade attempts to slice through some object that is too strong or too hard for the cutting action, the mechanical shock will be transmitted back through the blade 21 and motion transmitting block 75 to the pin 56. The mechanical shock of the stopping of the moving blade 21 will cause the Belleville springs 69 to momentarily release its grip on the pinion 55 so that the pinion 55 can rotate relative to the shaft 56 without transmitting any further motion to the shaft 56, block 75 and movable blade 21. In this way the motor will continue to operate and will continue to drive the pinion 55 no matter what the stationary or moving condition of the blade 21. Whenever an overload of any sort is created between the blades 20 and 21, the clutch arrangement between the shaft 56, Belleville spring 69 and pinion gear 55 will permit the motion transmitting member 75 and pinion 56 to remain stationary as the pinion 55 moves relative thereto. Once the obstruction is removed, the motion of the pinion 55 will again be transmitted through the clutch arrangement to the motion transmitting member 75 to move the blade 21.

Due to the nature of my novel construction, it is highly unlikely that an electrical short in the motor will cause electrical shocks to reach the hands of the operator or to reach the fixed or movable blades of the cutting members. That is, any short in the motor will be transmitted at most through the frame 25, but since there is no direct metal connection between the frame 25 and the handle 12, hand hold 14 or cutting members 20 and 21, the electrical shock will not be transmitted thereto. The nylon sleeves 78 around the bolts 77 between the frame 25 and the blade 20 break the conduction path from the frame 25 to the blade 20. Likewise, the shock cannot be transmitted through the transmission means to the movable blade 21 because the motion transmitting block 75 is formed of nylon or nonconducting material so that the electrical shock will be stopped at the end of the shaft 56. In the event the blades 19 and 20 came in contact with an electrical wire or other source of electrical power, the electrical shock can not be transmitted through the blades 20, 21 back to the housing due to the nylon sleeves 78 around the bolts 77 and due to the nonconducting character of the motion transmitting block 75 at the end of the movable blade 20.

Since the handle and housing are made of nonconducting shock resistant plastic material, they will not conduct shocks from the electrical source or from the motor or from the blades to the operator.

While I have shown in the drawings and discussed in detail one specific embodiment of my invention, this invention is susceptible of embodiment in many different forms and this specification should not be limited to the embodiment illustrated. The scope of the invention will be pointed out in the appended claims.

I claim:

1. An electric hedge trimmer comprising a shock resistant plastic outer housing having a pair of cutting blades outwardly extending therefrom, at least one of said cutting blades being movable with respect to the other of said blades to provide the cutting action for the trimmer, frame means removably mounted in said housing, motor means mounted on said frame means, transmission means mounted on said frame means and driven by the output of said motor means for reducing the speed of said motor means, spring clutch means driven by said transmission means, motion transmitting means engaged by the output of said clutch means and being operatively connected to said movable cutting blade, and said spring clutch means being constructed and arranged to slip when excess resistance is presented to the movement of said movable cutting blade.

2. A hedge trimmer having a housing, a motor and transmission module in said housing, said module comprising a frame having a bottom and side and end walls and divided by a partition extending between the side walls, means for fastening said frame to said housing, a motor means carried by said frame between one end wall and said partition, transmission means carried by said frame between said partition and the other end wall and being operatively driven by said motor means, means for connecting said transmission means to an output portion of said hedge trimmer, a fixed blade extending from said housing, means for insulating said frame from said fixed blade, a movable blade guided on said fixed blade and driven by said transmission means, and means for insulating said movable blade from said transmission means and from said frame whereby electrical shocks between the blades and frame are eliminated.

3. A power tool having a housing, a motor and transmission module in said housing, said module comprising a frame having a bottom and side and end walls and divided by a partition extending between the side walls, means for fastening said frame to said housing, a motor means carried by said frame between one end wall and said partition, transmission means carried by said frame between said partition and the other end wall and being operatively driven by said motor means, and means for connecting said transmission means to an output portion of said power tool, said motor means being resiliently mounted to said frame by spring clip means engaging between said motor means and said frame to prevent relative rotation therebetween, said spring clip means providing a resilient support for said motor means on said frame.

4. A power tool as claimed in claim 3 wherein radial and thrust bearing means are provided on said frame for supporting rotating parts of said motor means and said transmission means whereby radial and thrust loads from said motor means and transmission means are substantially absorbed.

5. An electric hedge trimmer comprising a shock resistant plastic outer housing having a handle and a hand hold member thereon, a metal frame means fastened in said housing, motor means, spring clip means engaging said motor means and said frame means to resiliently prevent rotation of said motor means relative to said frame means, a gear train carried by said frame means in engagement with the output of said motor means for reducing the speed of said motor, clutch means carried by said frame means and being driven by said gear train, insulating motion transmitting means engaged by the output of said clutch means, a movable cutting blade operatively connected to said motion transmitting means for receiving reciprocating motion therefrom, and a fixed cutting blade carried by said housing and extending outwardly therefrom, said movable cutting blade being guided on said fixed blade so that reciprocating movement of said movable blade relative to said fixed blade will provide the cutting action for the trimer.

6. A hedge trimmer as claimed in claim 5 wherein said clutch means comprises a pinion gear driven by the output of the motor through the speed reducing gear train, a shaft rotatably passing through said pinion gear and operatively engaging said insulating motion transmitting means, and spring means frictionally locking said shaft to said pinion gear for transmitting motion from said pinion gear to said shaft and to said motion transmitting means whereby excess resistance to said cutting blade will cause the shaft and pinion gear to slip relative to each other whereby the motor, gears and blades will not be damaged.

7. An electric hedge trimmer comprising a shock resistant plastic outer housing having a fixed cutting blade outwardly extending therefrom, frame means removably mounted in said housing, motor means mounted on said frame means, transmission means mounted on said frame means and driven by the output of said motor means for reducing the speed of said motor means, spring clutch means driven by said transmission means, motion transmitting means engaged by the output of said clutch means and being operatively connected to a movable cutting blade, said movable cutting blade being guided on said fixed blade so that movement of said movable blade relative to said fixed blade will provide the cutting action for the trimmer, and said spring clutch means being constructed and arranged to slip when excess resistance is presented to the cutting blades.

8. A hedge trimmer as claimed in claim 7 having means for insulating said fixed cutting blade from the frame means, and said motion transmitting means including means for insulating said movable cutting blade from said frame means whereby electrical shocks cannot be transmitted from the blades or from the motor.

9. A hedge trimmer having a housing, a motor and transmission module in said housing, said module comprising a frame, means for fastening said frame to said housing, a motor means carried by said frame, transmission means carried by said frame and being operatively driven by said motor means, means for connecting said transmission means to an output portion of said hedge trimmer, a fixed blade extending from said housing, means for insulating said frame from said fixed blade, a movable blade guided on said fixed blade and driven by said transmission means, means for insulating said movable blade from said transmission means and from said frame whereby electrical shocks between the blades and frame are eliminated, and clutch means are provided between said transmission means and said movable blade means whereby mechanical shock loads on the blades disconnect said motor means from said blade so as to prevent damage to said motor means.

References Cited
UNITED STATES PATENTS

| | | | |
|---|---|---|---|
| 2,650,993 | 9/1953 | Brown et al. | 30—216 X |
| 2,703,930 | 3/1955 | Bridenbaugh | 30—216 |
| 3,079,687 | 3/1963 | Jepson | 30—210 |
| 3,083,457 | 4/1963 | Ottosen et al. | 30—216 |
| 3,119,942 | 1/1964 | Luther | 30—216 X |
| 3,279,062 | 10/1966 | Andis | 30—210 |
| 2,664,626 | 1/1954 | Jepson | 30—123 |
| 3,121,813 | 2/1964 | Pratt et al. | 310—50 |

ROBERT C. RIORDON, *Primary Examiner.*

J. C. PETERS, *Assistant Examiner.*

U.S. Cl. X.R.

30—216, 220